United States Patent [19]
Anderson

[11] Patent Number: 5,479,507
[45] Date of Patent: Dec. 26, 1995

[54] COPY INDICATING SECURITY DEVICE

[75] Inventor: Zoe M. E. Anderson, Chineham, United Kingdom

[73] Assignee: Thomas De La Rue Limited, United Kingdom

[21] Appl. No.: 214,635

[22] Filed: Mar. 18, 1994

[30] Foreign Application Priority Data

Jan. 19, 1994 [GB] United Kingdom .................. 9400942

[51] Int. Cl.⁶ ..................................................... H04L 9/00
[52] U.S. Cl. ................. 380/3; 380/51; 355/201; 283/93; 283/94; 283/902
[58] Field of Search ..................... 380/3, 4, 51; 355/201; 283/93, 94, 902

[56] References Cited

U.S. PATENT DOCUMENTS

| | | | |
|---|---|---|---|
| 1,692,405 | 11/1928 | Freeman | 283/94 |
| 4,168,088 | 9/1979 | Somlyody | 283/8 R |
| 4,175,774 | 11/1979 | Tonges et al. | 283/6 |
| 4,227,719 | 10/1980 | McElligott et al. | 283/8 R |
| 4,341,404 | 7/1982 | Mowry, Jr. et al. | 283/8 B |
| 4,420,175 | 12/1983 | Mowry, Jr. | |
| 4,579,370 | 4/1986 | Corwin et al. | |
| 5,074,596 | 12/1991 | Castagnoli | 283/91 |
| 5,197,765 | 3/1993 | Mowry, Jr. et al. | 283/93 |

FOREIGN PATENT DOCUMENTS

| | | | |
|---|---|---|---|
| 0204552 | 12/1986 | European Pat. Off. | 283/93 |
| 0546765 | 6/1993 | European Pat. Off. | |

*Primary Examiner*—David C. Cain
*Attorney, Agent, or Firm*—Oliff & Berridge

[57] ABSTRACT

A copy indicating security device includes at least one symbol defined by a first arrangement of print elements, the or each symbol being provided in a background defined by a second arrangement of print elements. Under normal viewing conditions the security device presents a substantially flat tint to the eye. The first and second arrangements of print elements differ from one another so that on copying the device at least one of the symbols is revealed. The perimeter of the or each symbol is generally irregular.

26 Claims, 17 Drawing Sheets

COPY INDICATING SECURITY DEVICE

FIELD OF THE INVENTION

The invention relates to a copy indicating security device and to security documents on which such a device is provided.

DESCRIPTION OF THE PRIOR ART

Many examples of copy indicating security devices are known some of which are disclosed in U.S. Pat. No. A-4579370 and U.S. Pat. No. A4420175. Such security devices generally present a flat tint like structure to the eye which on copying reveal a warning message. Typically the word "VOID" is revealed.

Anti-reproduction line structures have been previously disclosed to inhibit copying by photographic means, digital colour proofing scanner means, or colour xerographic copying means whether by optical projection or digital colour separation.

The intention in most cases is for the warning message to be concealed in a flat tint structure and for letter or warning symbol shapes to be revealed when a counterfeit is made.

These warning messages take the form of characters which exhibit a visually significant area rather than being formed from thin lines. For example the warning message character area could perhaps cover ten percent or more of the security device area.

Despite the many devices which have been developed over the years it is possible for the existence of these subtle devices to be revealed when the device area is viewed under magnification, perhaps ten fold magnification. Thus the counterfeiter could establish through visual inspection and without necessary resort to a colour copier that a warning message is present in the device area. In some cases the message can also be seen by the unaided eye which is undesirable.

SUMMARY OF THE INVENTION

In accordance with the present invention, a copy indicating security device includes at least one symbol defined by a first arrangement of print elements, the or each symbol being provided in a background defined by a second arrangement of print elements, wherein under normal viewing conditions the security device presents a substantially flat tint to the eye and wherein the first and second arrangements of print elements differ from one another so that on copying the device at least one of the symbols is revealed and is characterized in that the perimeter of the or each symbol is generally irregular.

In preferred arrangements, the background print elements extend across a nominal perimeter line of the symbol defined by the first arrangement of print elements. This interleaving assists in obscuring the existence of the symbol under normal viewing conditions.

Typically, at least one of the first and second arrangements of print elements comprises a tessellated arrangement of groups of print elements. For example, an arrangement of separate groups ("islands") of print elements may be provided on an evenly coloured surface, each separate island being formed of an array of print elements (such as a series of lines and/or dots) printed on the surface such that the appearance of any island to the unaided eye is that of an even coloration, in which each island appears to the unaided eye to have substantially the same colour as its neighbouring islands, in which a set of islands having a common print element pattern defines a visually recognisable warning message symbol, in which each island not forming part of the symbol has a different line or dot pattern to a print marking used in the first set of islands, such that on attempted reproduction of the device by reproducing means which comprise a regular image capturing or printing output structure, the printed reproduction of the warning message symbol is visually revealed to the unaided eye.

In one embodiment more than one warning symbol may be provided and this may be formed with flat tint markings which are intended to be reproduced if the document carrying the device is copied at a different orientation.

In another embodiment the islands are irregularly shaped and may be slightly spaced apart provided that the overall appearance of the device is one of flat tint uniformity with an optional camouflage pattern formed by the background showing clearly between islands.

Flat tint print elements are evenly or regularly placed such that the overall appearance is one of unvarying or regularly changing uniformity.

They generally comprise a series of elements which are not resolvable to the eye, set against a substantially plain background. The elements may be formed of a series of parallel lines which may be equidistant or slightly radiating; dots whether randomly or regularly placed; or other miniature geometric or alphanumeric shapes.

In the preferred embodiment the print elements may be a parallel line set or a diverging line set in which the divergence of the adjacent lines is less than 1 degree, possibly less than 0.1 degree.

The symbol may be in the form of the shape of a letter, number, geometrical symbol, logo or the like. The symbols may combine to form a word or textual pattern or a graphical pattern. More than one word may be employed or the same word may be repeated a number of times, optionally at substantially different intended reading orientations for example two, three, four, five or six.

In each case the warning symbol will exhibit a visible area.

Thus for example the letter "I" could be formed in sans serif as an upright rectangle: it would have a clearly recognisable perimeter bounding an internal area, this being set against a background.

In the prior art the perimeter of such a character would be formed substantially by four straight or even lines.

According to the present invention the outline would be irregularly formed while still allowing the information content of the symbol depicted to be perceived and understood.

In one embodiment the symbol area may be filled completely with lines or dots or a combination of the first type of flat tint structure, so providing a flat tint appearance to the unaided eye, and the background would be formed of flat tint structures which reproduce differently on the reproduction means at least at one orientation of reproduction to the flat tint structure of the first set. The appearance of the security device would however be of a single flat tint.

In the preferred embodiment the symbol is formed from a tessellated structure of juxtaposed shapes which may be in contact or may be slightly spaced apart. The background is formed of a balancing tessellate structure of a flat tint structure of a different kind.

For the purposes of clarity of explanation the background pattern with respect to any one symbol comprises all other areas in the device which have a different flat tint structure to that used in the symbol and this will include any secondary symbols which are presented at a different orientation with a view to revealing a warning message if the device is copied at a different orientation from that of maximum response of the first symbol flat tint structure.

In another embodiment the device may be formed of substantially evenly spaced randomly shaped areas, "islands" in which a series of islands of the first flat tint type combine to depict visually a symbol.

In another embodiment the symbol may be formed of islands selected from two different i.e. first and second, flat tint structures, in which generally alternating islands (or island groups) within the symbol are of the first flat tint structure and the others forming the symbol are from the second set, and the other (background i.e. non warning message symbol forming) islands in the device are chosen from third and optionally fourth or more flat tint structures which respond differently on copying to either the first of second flat tint set at at least one angle of device orientation with respect to the copying means.

The periphery of the symbol may be a continuous line around the symbol or may be a notional minimum length line around the symbol if separate islands are used.

In each case the symbol periphery will not exhibit an undeviating straight or curved line such as would normally be found in the normal graphical depiction of the device.

Rather in the invention the real or notional periphery will be irregular. Thus for example it will change what would be in the normal typographical arrangement for a font or the normal graphical outline of a logo or other symbol, a straight line or smooth circular line to a deviating line.

The periphery may encroach into the nominal plain symbol area provided that this does not substantially detract from the readability of the character. This point will be demonstrated in the exemplary Figures which follow later.

The depiction of any character in its simplest form i.e. the normal form of the character which would be used in design, will result in a perimeter of a predetermined length. This perimeter lining which may be on the outer periphery of the character or an inner periphery is the minimum which can be used to depict the character withthat style of font. The irregular perimeter of this invention will cause the minimum total periphery of the character to be increased by perhaps by 10% or more.

By altering the edges from regular to irregular but without substantially distorting the plain area within the perimeter, the linearity of edges which the eye so readily notices is reduced but the recognition of the character is not substantially reduced. Thus in effect the perception that a warning device is present can be suppressed. It is thought that this may be because the visual cortex within the eye more readily identifies regular shapes and lines than random lines.

By providing irregular outlines it becomes substantially more difficult to identify that a latent security warning symbol is present but on copying the area within the symbol then provided the regularity for the eye to determine from the pattern presented that a symbol is present.

The use of spaces between the islands or overprint where spaces might be can additionally provide a camouflage pattern which is more immediately noticeable and set against a flat tint structure which comprises the concealed warning symbol.

The markings or elements may be placed by any marking method such as an ink printing method, especially lithographic printing.

Other marking methods could be used in appropriate instances such as high resolution laser engraving using a heat generating laser, or thermal or other forms of printing including electronic imaging methods whether vector or bit map controlled, if suitable for the application.

In this invention the flat tint markings are preferably formed of lithographic printing ink which has a grey or tinted grey appearance. Other mute colours could be used but it is preferred that the colours are not magenta, cyan or yellow on their own.

The printed density of each ink should be above the threshold of sensitivity of the scanner of the colour laser or other copier.

The method also allows for the printing of metallic effect inks or optically variable or other special purpose coloured inks such as coloured fluorescent inks or coloured phosphorescent inks. The inks used to print the flat tint structures may be rainbow blended as known in the art.

In a preferred embodiment of the invention the security device is printed with one ink (or a rainbow blend of two inks) during one rotation of a print cylinder. It is not preferred to print the warning pattern with one plate and the background from a second plate as colour matching and registration problems may occur.

This invention will be principally described in the context of lithographically printed parallel line sets.

In a genuine document the device will provide a substantially uniform appearance to the unaided eye such as a grey or tinted grey colour which may be tinted, or metallic in appearance or rainbow printed.

The reproduction means which may be nefariously employed for the attempted colour reproduction of genuine documents carrying the device include colour separation graphic arts cameras and apparatus which comprises a digital scanner.

The photographic colour separation method employs halftone screens: each screen is set at different orientation for each colour so as to avoid Moire effects.

Halftone colour separation methods and printing are also employed in the electronic proofing scanners which are used in the graphic arts and in colour laser copiers which typically deposit dry toner. Colour photocopiers which operate by projecting the image directly onto a photosensitive drum also employ screens so that a halftone format is created.

The result is that the colour copy is be formed from a halftone combination of the subtractive colours with normally an additional black tint. Each of the above colour separation method employs a periodic structuring within the image capturing train.

The character size is chosen to be such that on reproduction the warning message will be readily noticeable. The characters are thus arranged to be at least a few millimetres in height on the final document.

In the preferred embodiment the structures from one set to another are parallel line sets disposed in different orientations.

In other embodiments there may be dots or curved or other structures provided that on copying a visually discernable difference results on the copy.

As different reproduction methods have different resolutions according to the method may be possible to provide two line structures for any one set. Thus for example while keeping the percentage area of the flat tint area which is covered by ink the same and not resolvable to the eye it may be possible to provide two line frequencies. Thus for example the lower frequency lines may be employed as a defense against colour separation camera work and the high frequency work against colour scanners such as colour laser copiers or digital colour proofing scanners.

While it is principally intended that the flat tint areas should be relatively plain there may be some low area coverage patterning. This may be done by forming random gaps of width usually less than the maximum structure spacing or by providing regular gaps or by providing a light overprint which does not substantially impede or conceal the device or its replication or detection.

Although the use of grey and muted colours is appropriate for use in devices primarily intended for colour separation detection, the devices of the invention may be employed against single colour scanning methods and here the interference may originate form the digital scanning method, toner drag or optical non uniformity.

Security documents which may employ the device include bank notes, travellers cheques, bank cheques, tickets, passes, bonds, vouchers, bonds, certificates, fiscal documents, identity cards, passes, permits, licences, ballot forms, legal documents, vouchers, security labels, certificates of authenticity, brand protection labels, warranties, vehicle registration documents, passports, passbooks, credit or debit slips, credit cards, charge cards, financial transaction cards, bingo tickets, gaming tickets, lottery tickets, and copy indicating paper suitable for electronically controlled printing.

The method of providing the device in accordance with the invention is preferably lithographic printing but it is also possible for high resolution electronic printing methods to be used or to affix a label or seal which carries the device to a document.

It is intended that the device should have an even coloration, including rainbow printing tonal graduation when perceived at the normal viewing distance. Any spatial pattern between islands allows the evenly toned background to show through, and this pattern provides an area of visual attention for the eye.

In a device comprising warning message islands and background islands only, the warning message and background islands may be formed of the following structures which are not resolvable to the naked eye for example: a series of regularly spaced parallel lines for the warning message and the same series orientated at a substantially different angle (at least 20 degrees, preferably at least 45 degrees or more): a series of regularly spaced parallel lines for the warning message and a similar series having half the line frequency but double the line width at the same or another orientation.

A series of regularly spaced almost parallel lines in which adjacent lines diverge at less than one degree of arc for the warning message and the same series orientated at a substantially different angle (at least 20 degrees, preferably at least 45 degrees or more):

a series of regularly spaced parallel lines for the warning message and an array of line segments or dots set at the same or a different orientation:

an array of regularly spaced same size dots of one size for the warning message and a different array of dots (for example at half the array frequency but with the dots having double the area) with the arrays having the same or a different orientation:

an array of regularly spaced same size dots of one size for the warning message and a different array of dots having two sizes of dots which alternate, one size being smaller than the dots of the warning message array and the second larger, these arrays being at the same of a different orientation.

When it is desired to make a warning symbol out of two different flat tint structures these may be of the kind above.

Alternating dots or alternating lines within any islands will normally be printed in one colour of ink. They could however be in theory be formed by printing one set in one colour and one set in another colour: the difficulties of printing ink registration control however make this method less preferred.

In order to make a parallel line flat tint structure, a series of parallel lines may be drawn at a frequency of between three and ten lines per millimetre such that in any one island all of the parallel lines present will have the same width and spacing. The width of the lines may be selected within the range of 50 to 150 microns and the spaces between adjacent lines selected within the range of 180 to 280 microns e.g. lines of 75 microns width in a set with gaps of 255 microns between adjacent lines.

In any one parallel line set the line widths will normally be constant as will the spaces. Normally at least three parallel lines may be counted in each island if parallel line structures are being employed.

Line sets which are approximately parallel may also be used. For example the lines in any such set may be selected such that each has a width within the range 50–150 microns, neighbouring lines being spaced apart by a line width gap selected within the range of 50–150 microns and such that neighbouring spaces converge at an angle selected between 1 and 2 degrees. For example, the lines may have a width of 75 microns, an initial spacing of 115 microns, and a convergence such that neighbouring spaces then approach at an incidence angle of 1.29 degrees.

As between islands which form the warning message and islands which form the background to the warning message, the same line structure width and spacings can be used although the orientation of sets of parallel lines will normally differ by between 30 and 90 degrees.

If there is a plurality of sets then a background will be formed if at least one of the other lines sets has an orientation of at least thirty degrees with respect a warning message set e.g. four line sets may be of the same width and spacing but have relative orientations of 0, 45, 90 and 135 degrees.

It is possible for the lines from one set to another to have the same angular orientation but here differentiation is engendered by causing there to be a difference between the widths and spacings of the line sets, while still maintaining the flat tint visual appearance. For example, a flat tint structure of one set of line widths and spaces can be used beside a similar set in which the lines have been doubled in width but their frequency halved such that under normal viewing conditions both types present the same flat tint appearance to the eye.

In any one security design a number of types of islands or the like may be employed, being designed to copy differently at one or indeed more than one angle of orientation with respect to the intended orientation of the sets on the security document. For example, the sets may be designed to interfere with copying when a document is placed at the normal rectilinear angle on the copying equipment, and/or at right angles to that orientation and/or optionally at other angles such as 45 degrees.

The flat tint structures need not always respond differently during every different type of copying process although it is desirable that they should. For example, one reproduction system may employ a comparatively coarse periodic structure: one set of warning message islands and one set of backgrounds may be satisfactory for that periodicity. Another reproduction system may be capable of a finer resolution and periodic structures may be printed with line widths, gaps and orientations, which would respond differently under the different, finer resolution, reproduction train conditions.

Thus different resolutions would be chosen to inhibit copying using periodic optical reproducing means such as camera screens or digital electronic scanning heads (including digital image scanning heads for use on colour separation proofing scanners or colour xerographic copiers such as colour laser copiers) which may have a reproduction resolution within the range of at or more than 5 lines per millimetre, to perhaps 25 lines per millimetre, for example 10, 12, 14, 15,, 16, 18, 20, 21, 22, 24 lines per millimetre.

A document may thus have two anti-copy areas, at least one of which is in accordance with the invention, but preferably with both in accordance. The other if not in accordance may utilise a known kind of anti-copy structure.

As an alternative a single anti-copy device area on a document may be designed to have two differently responding anti-copy devices which intermesh and which may have the same or a different flat tint appearance. If they are different one set may have a stronger density and one set a lesser optical density but both have the same hue. Here the eye would see one apparently random pattern of a stronger colour on a background of the other with optionally spaces also being visible between islands.

Dot structures may also be employed to provide flat tint areas. Here, for example, an array of dots of one size, one spacing and one orientation may be employed, so as to provide a flat tint appearance. A second set having a substantially different orientation of the array may be employed. Here the angular orientation between the arrays may differ by at least thirty degrees.

Alternatively, the size of the dots may be increased and the array frequency decreased while still providing the same flat tint appearance to the eye. In another alternative, a dot array may be provided with a random first distribution of dots this being used with a regular array.

The anti-copy devices of the invention may be overprinted or underprinted provided that the operation of the device is not substantially impeded. For example, the device may be used to provide a security printed background on which details relating to the document are then printed. For example, in a public transport ticket the anti-copy device may be provided on the back of the ticket, covering substantially the whole area of the back of the ticket: this may be overprinted with relatively miniature text providing extracts of the conditions which the transport authority applies to the ticket issuance. Alternatively, as part of an identification card the area may be overprinted with xerographic toner markings which identify the card holder, the card serial number or the like, while still revealing a substantial area of the anticounterfeiting device.

BRIEF DESCRIPTION OF THE DRAWINGS

Some examples of security devices according to the invention will now be described with reference to the accompanying drawings, in which.

DETAILED DESCRIPTION OF THE EMBODIMENTS

The Figures show the warning messages and backgrounds substantially enlarged. Naturally the device would be printed in reduced size, for example with the warning symbols having a height of approximately 1 cm. In the Figures the line and dot structures which would fill in the island shapes are not shown.

Figure 1:
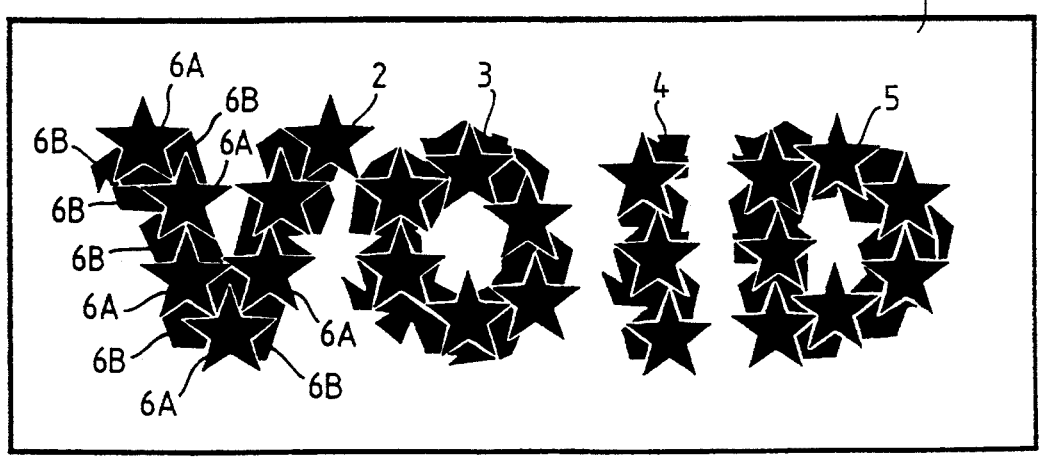
FIG. 1 illustrates the symbols making up a first security device.

FIG. 1. This shows an anti-copy device area 1 intended for use on a security document such as a banknote.

It comprises warning message symbols, 2 ( "V" ) , 3 ("O"), 4 ("I") and 5("D") which combine to form the warning word "VOID". Each symbol is formed of interlocking islands 6A,6B (only a few are identified by reference numerals). The perimeters of the symbols 2 to 5 are irregular. The islands 6A are regular (star shaped) polygons and the islands 6B are irregular polygons. They have straight edges but there is no reason why curved peripheries could not be employed as will be shown later.

The perimeter of symbol 2 is taken to be the line which follows the external black outline of the "V" shape. The perimeter crosses any minor gaps between the different islands taking the shortest route from one island to the next.

Perimeters of symbols 3, 4 and 5 can also be established by analogy. The name of the alphanumeric character defined by each shape, 2, etc., can clearly be read despite the unusual outline.

Figure 2:
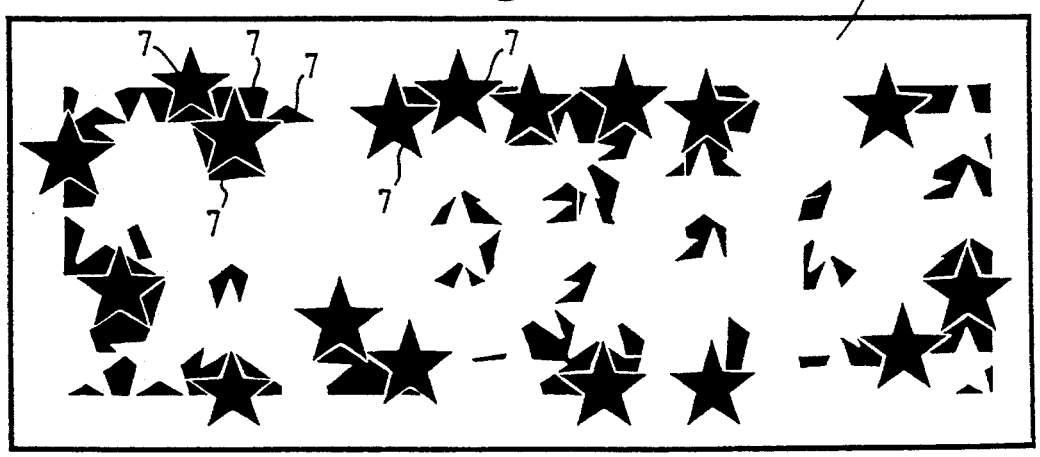
FIGS. 2 and 3 illustrate backgrounds made up of respective, different line structures for use with the FIG. 1 symbols.
Figure 3:
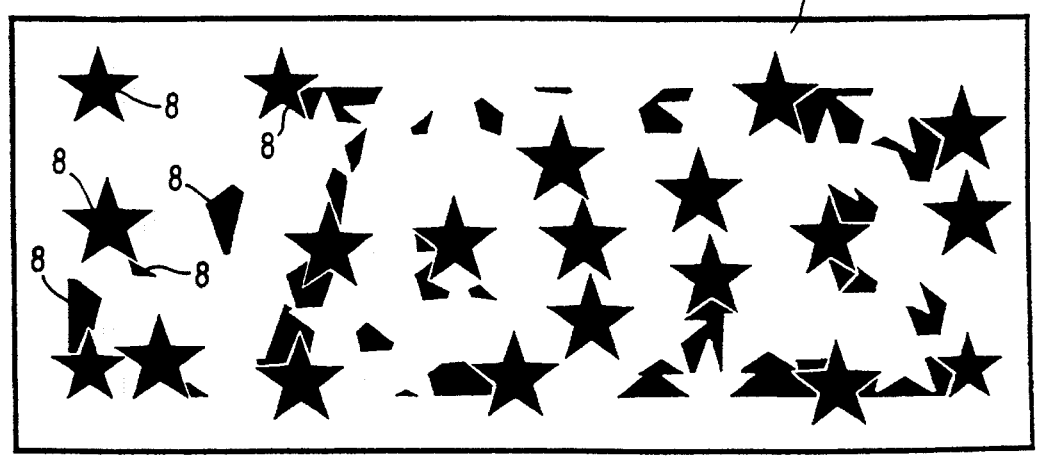

Two background island sets, 7 and 8 (only some shown for clarity) for use in designating island areas in the remainder of the device are shown in FIGS. 2 and 3. The line structures (not shown) in the islands 7 will be substantially the same, the line structures (not shown) in the islands 8 will be substantially the same, and the line structures (not shown)

in the islands 6A,6B will be substantially the same. However, the line structures in islands 6A/6B,7 and 8 will differ from each other so that on copying, the sets of islands in FIGS. 1, 2 and 3 will respond differently so that the warning word is revealed. The appearance of the flat tint structures in the printed device would be the same from the normal viewing distance.

Figure 4:
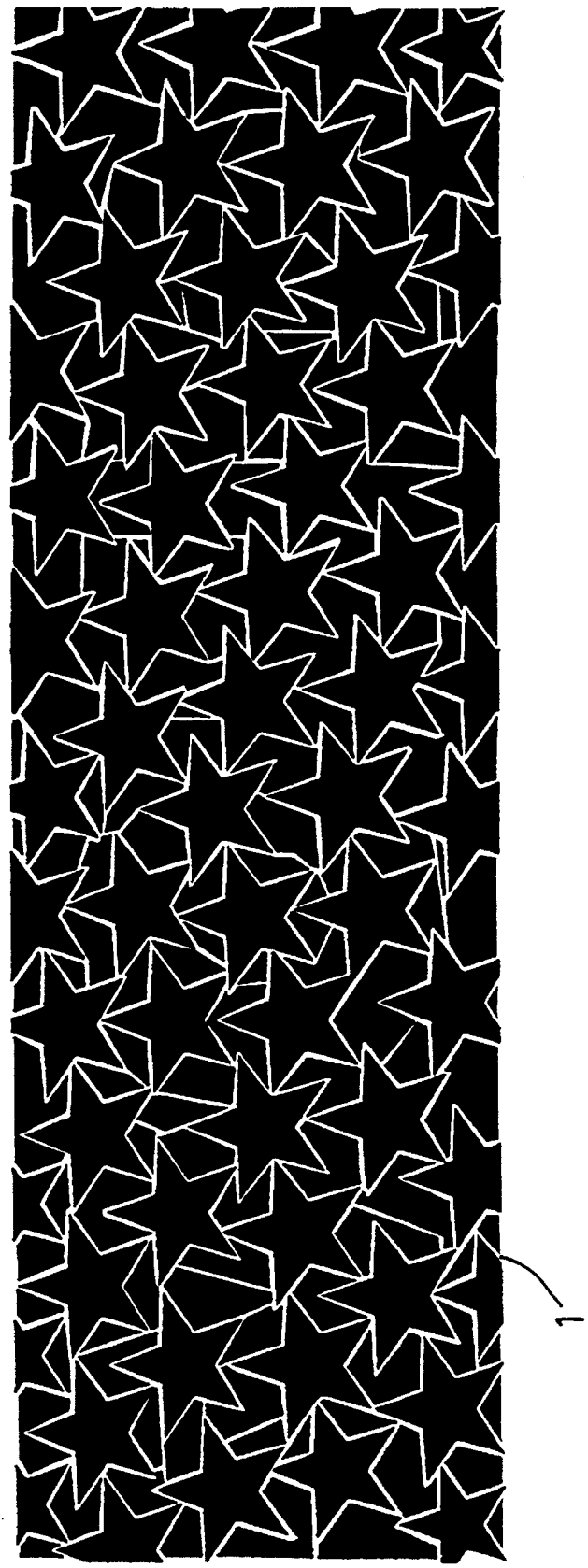
FIG. 4 illustrates the appearance of the security device bearing the symbols of FIG. 1 and backgrounds of FIGS. 2 and 3.

These areas combine to cover substantially the full anticopy device in FIG. 4. The appearance of the device is thus of an intermeshing star and polygon array. It is not readily possible to determine the location or existence of the anticopy message other than by resort to the maps for FIG. 1, or to the device after copying or by the use of a magnification. Even on magnified viewing the irregular outline makes the identification of the characters very difficult.

Figure 5:
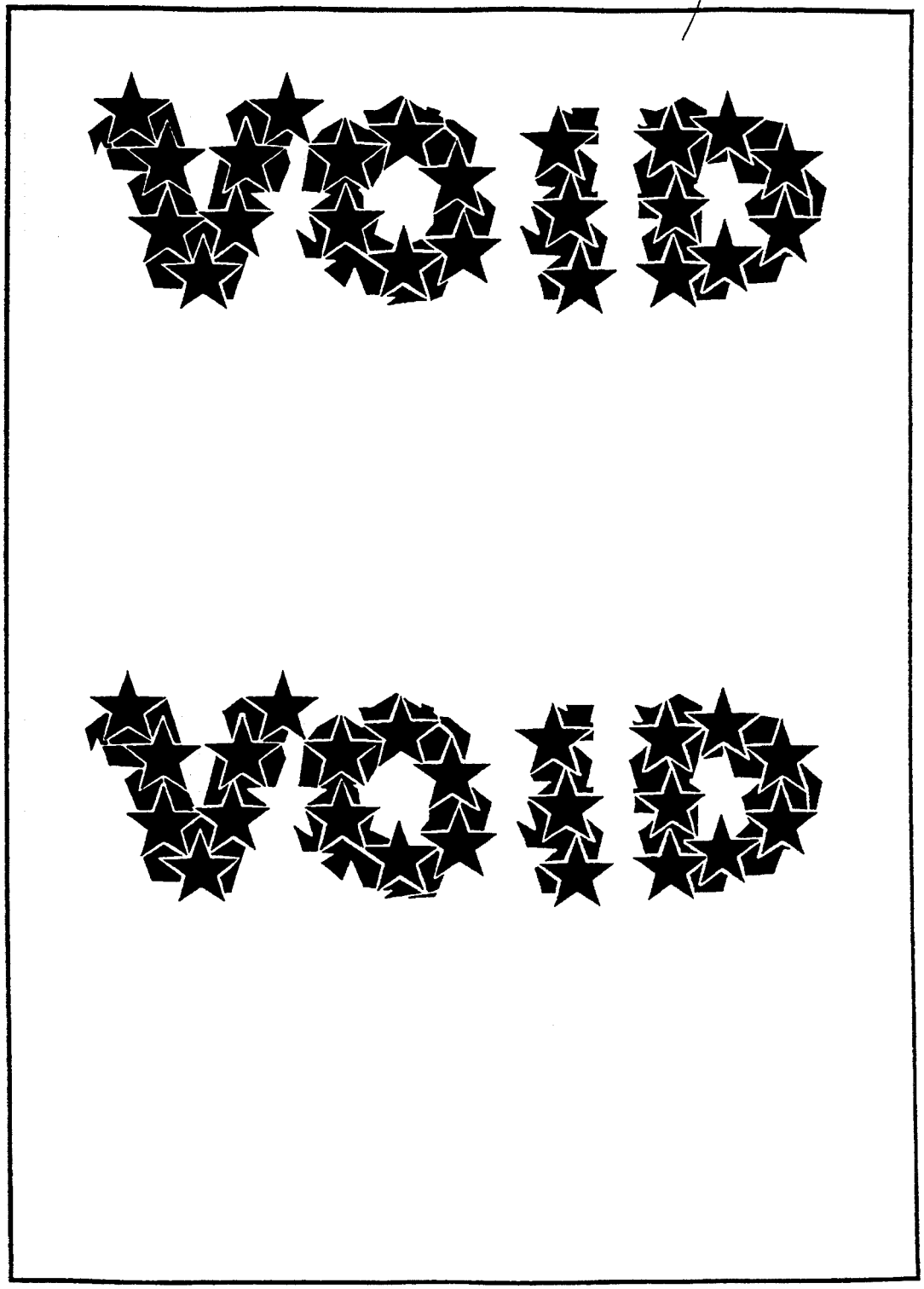
FIG. 5 illustrates two sets of symbols making up part of a second example of a security device.
Figure 6:
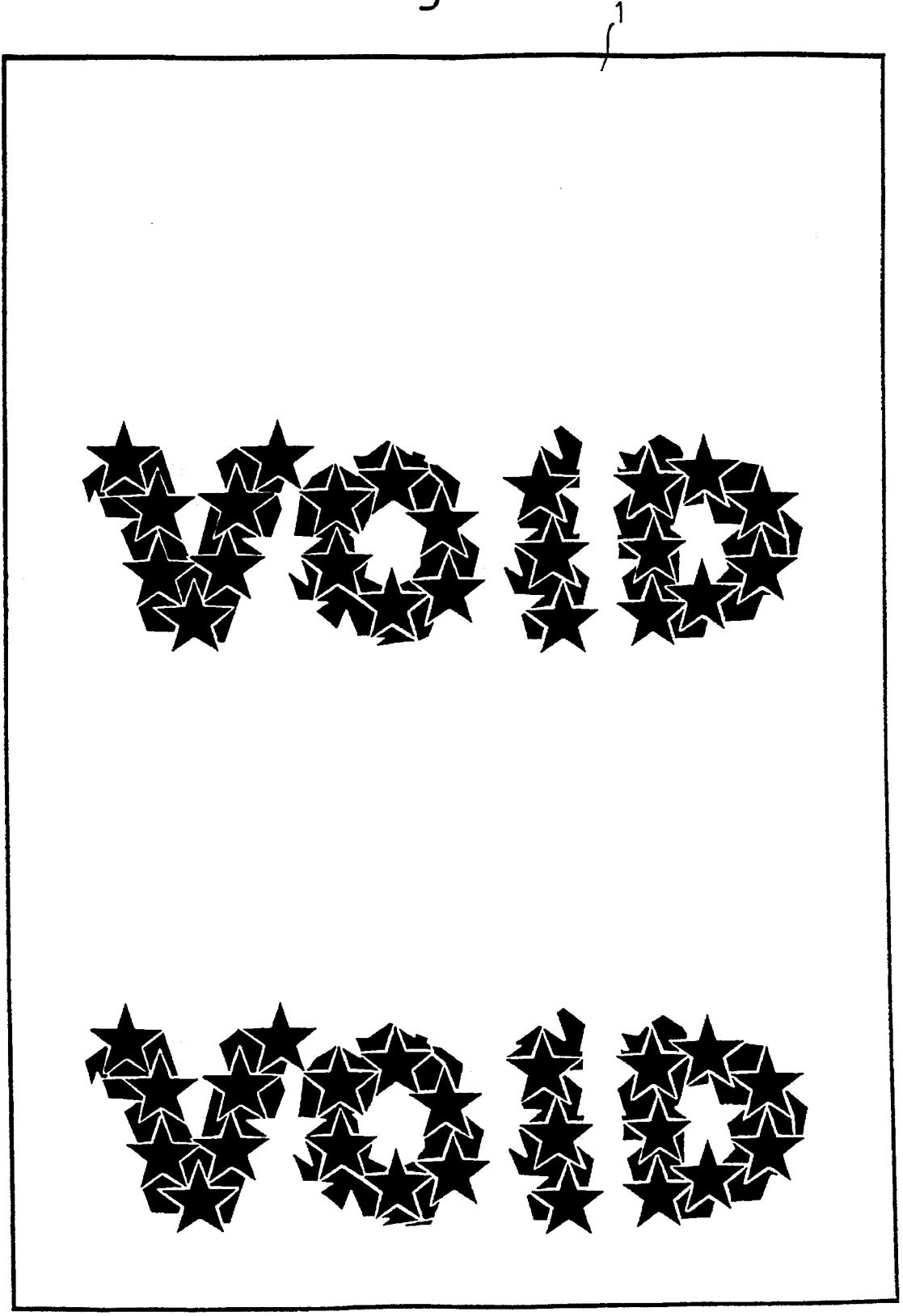
FIG. 6 illustrates two further symbols making up another part of the security device of FIG. 5.

In FIG. 5 there is defined a device area 1 and two sets of islands depicting the word "VOID" twice. The same or different flat tint patterns may be used for the two presentations of the warning word. In FIG. 6 there is defined device area 1 and two further sets of islands depicting the word "VOID" twice.

Figure 7:
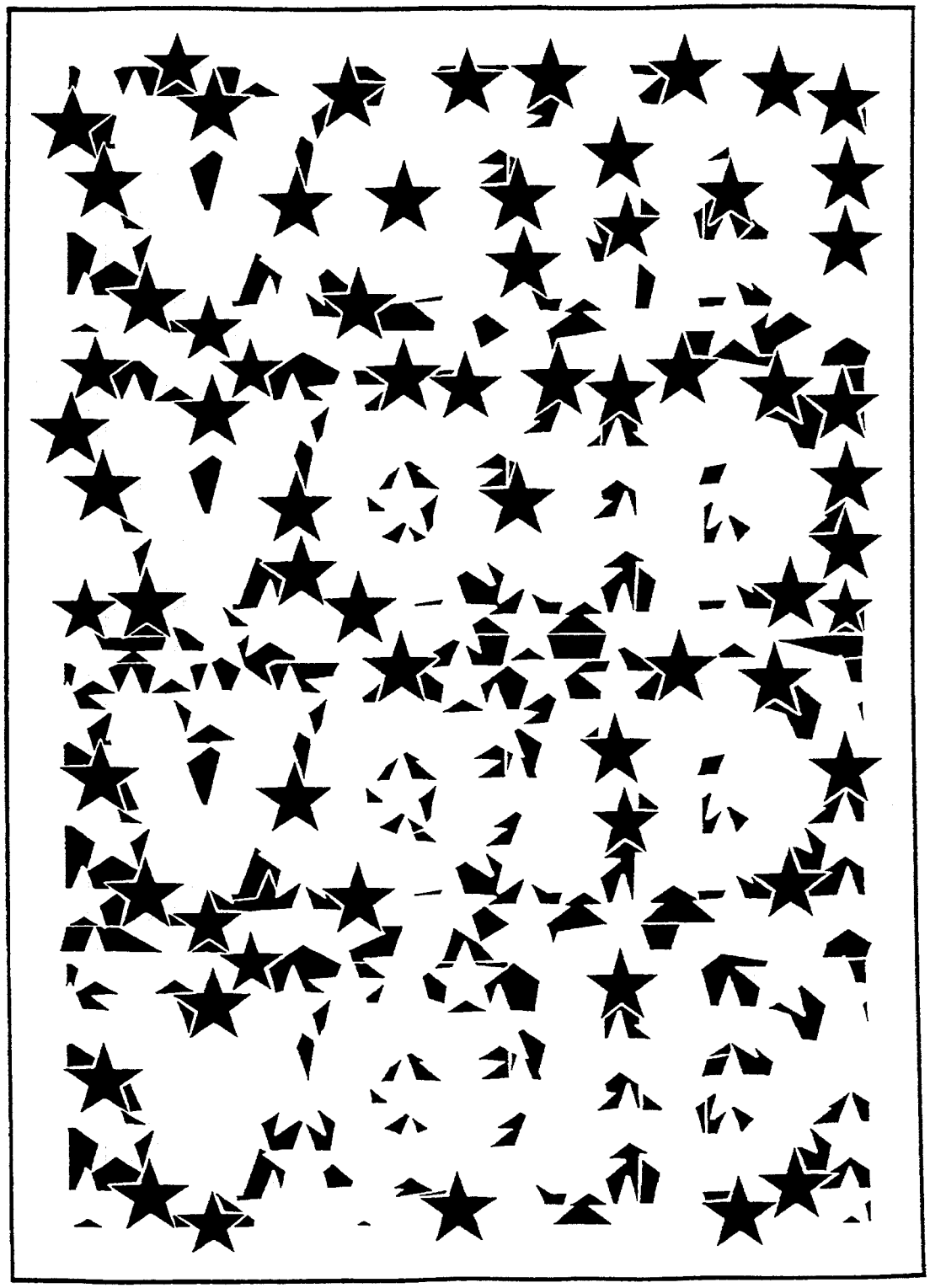
FIGS. 7 and 8 illustrate background portions of respective different line structures for use with the security device symbols of FIGS. 5 and 6.
Figure 8:
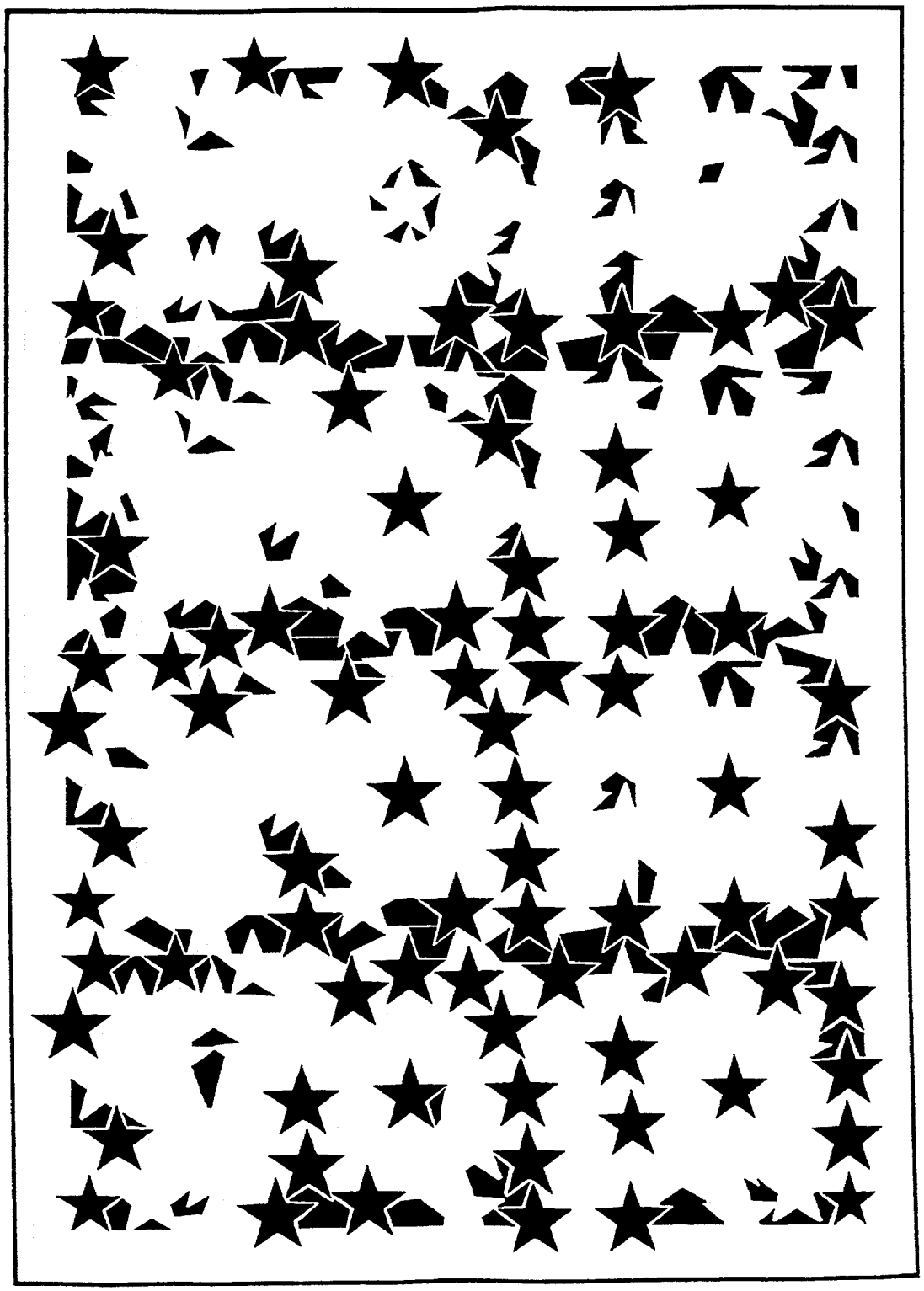
Figure 9:
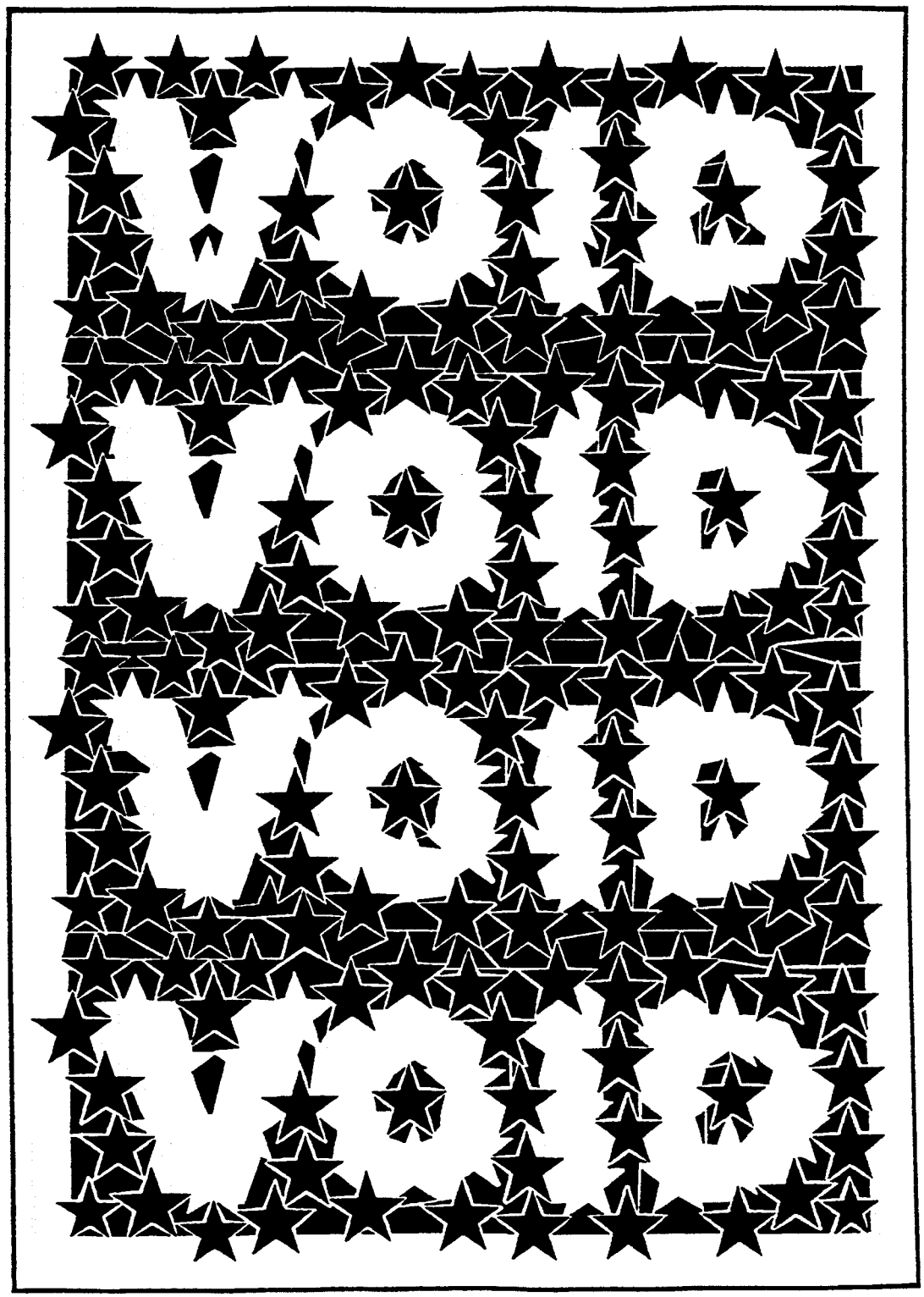
FIG. 9 illustrates the background portions of FIGS. 7 and 8 combined together.
Figure 10:
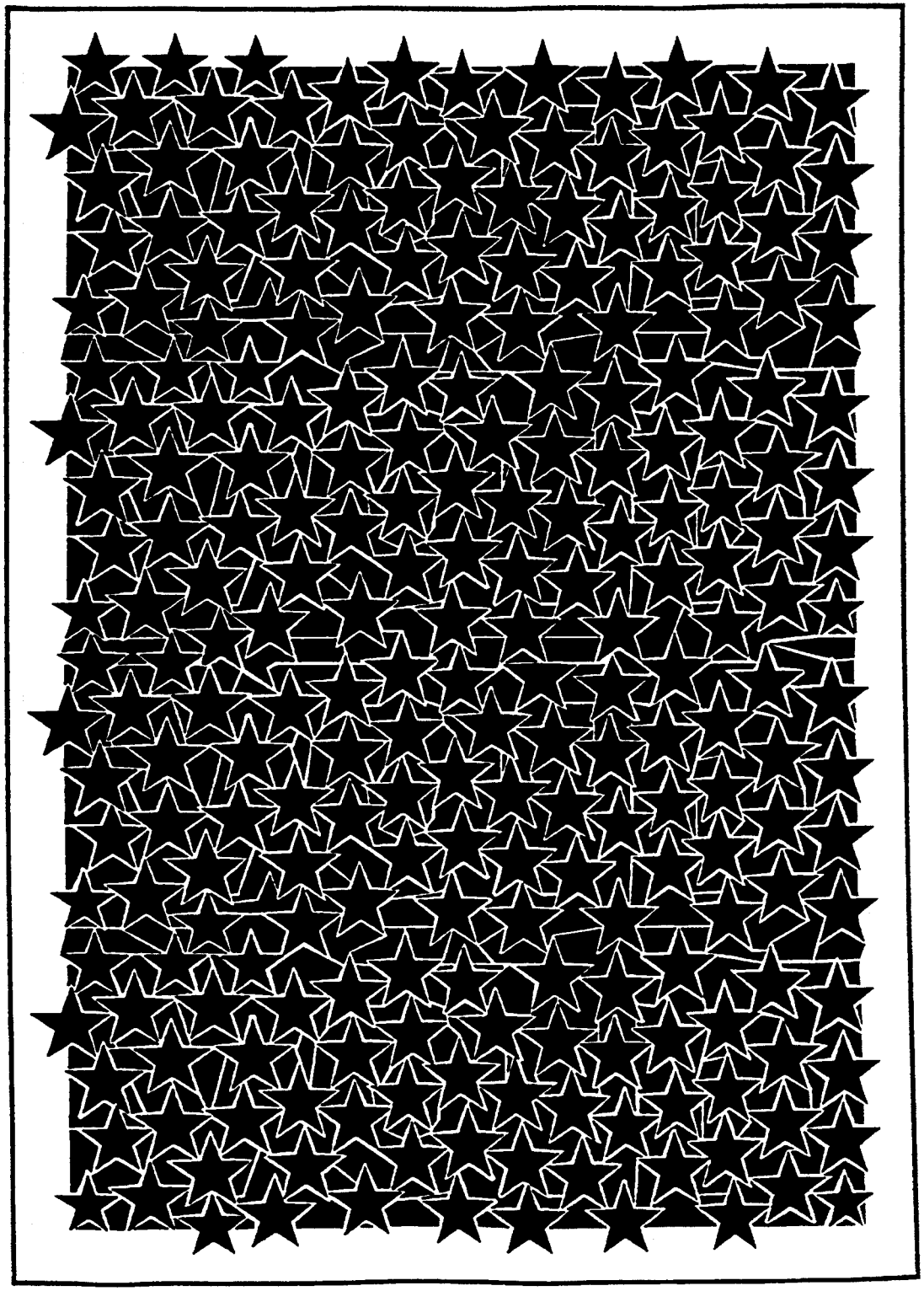
FIG. 10 illustrates the symbols of FIGS. 5 and 6 combined with the background of FIG. 9.
Figure 11:
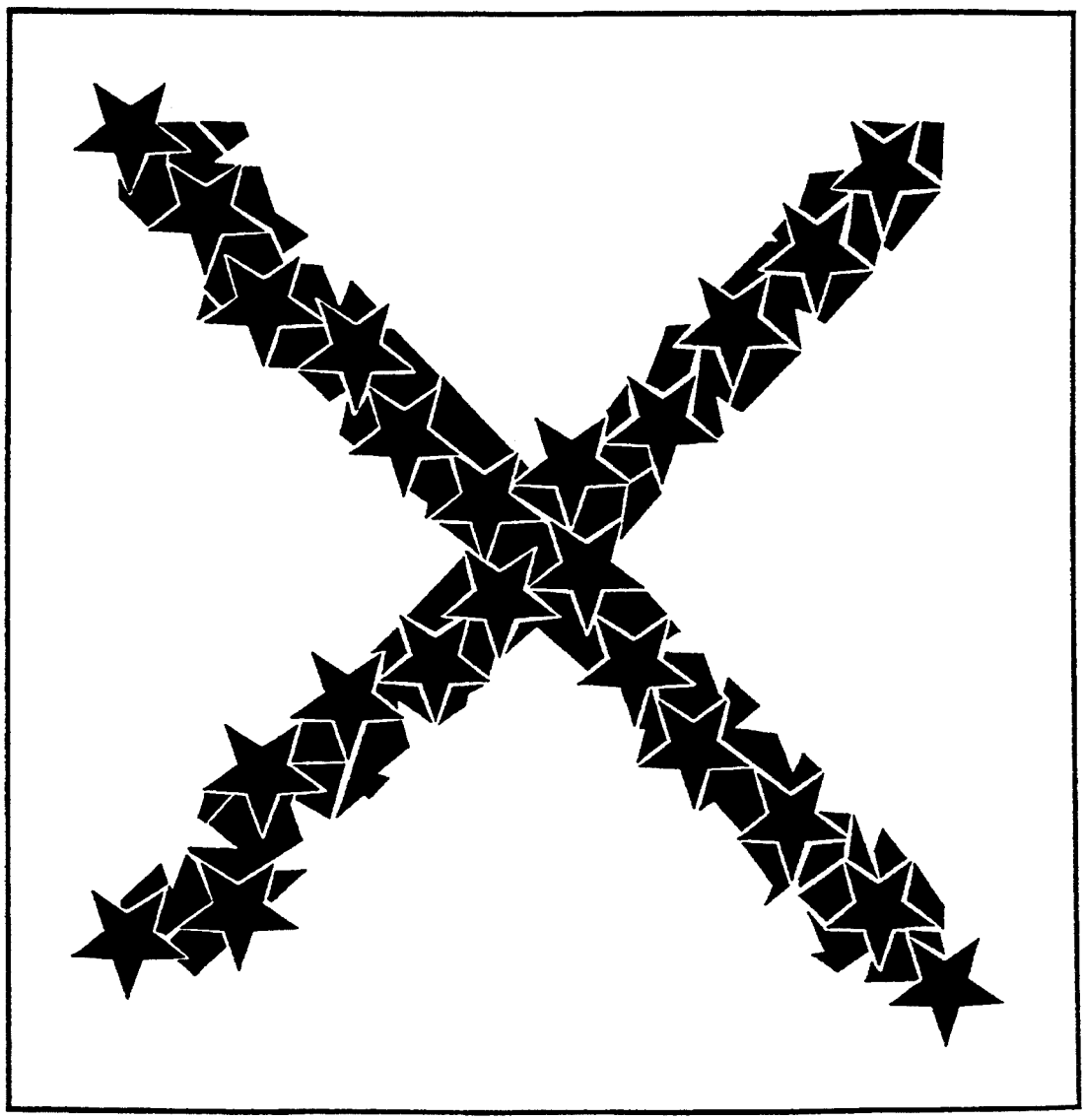
FIGS. 11–14 illustrate four further examples of security symbols for security devices.
Figure 12:
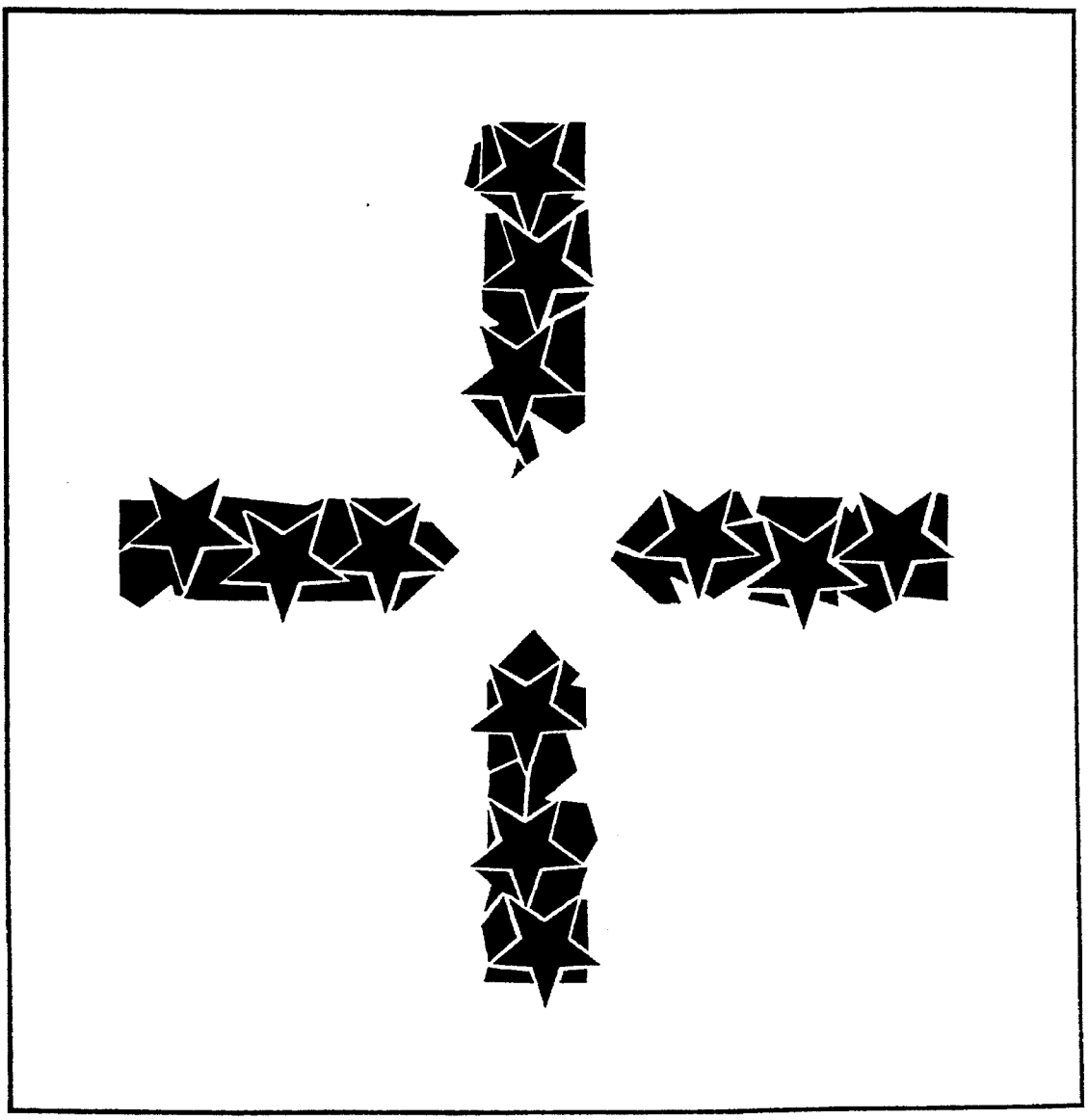
Figure 13:
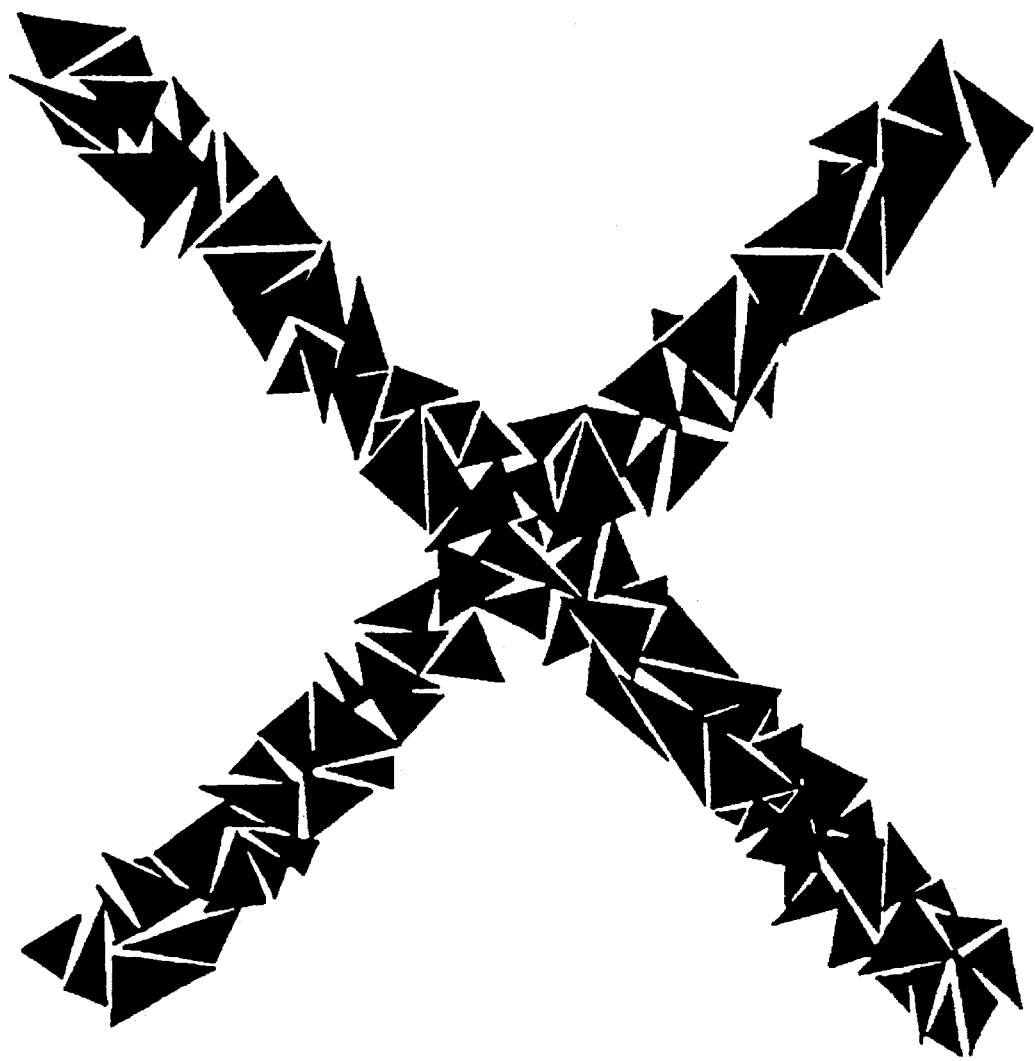
Figure 14:
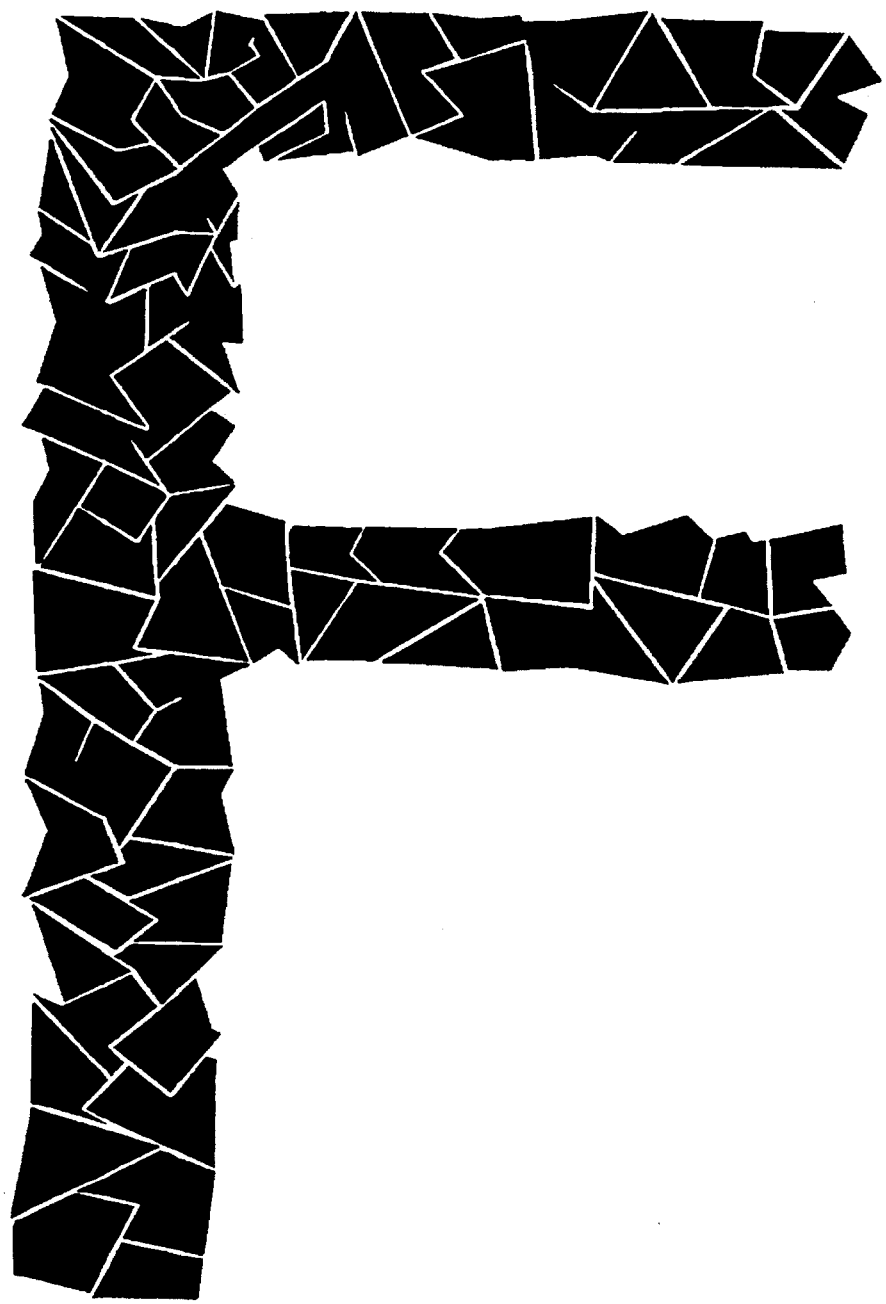

By combining the areas of FIGS. 5 and 6 the background is defined and this can be filled with two sets of islands as shown in FIGS. 7 and 8. The two backgrounds combine to form the composite background as shown in FIG. 9. The islands of FIGS. 5, 6, 7 and 8 combine to form the device island areas shown in FIG. 10 with each set of islands being defined by different line structures as before so as to respond differently on copying.

Other warning symbols formed of polygons are shown in FIGS. 11, 12, 13, and 14.

Figure 15:
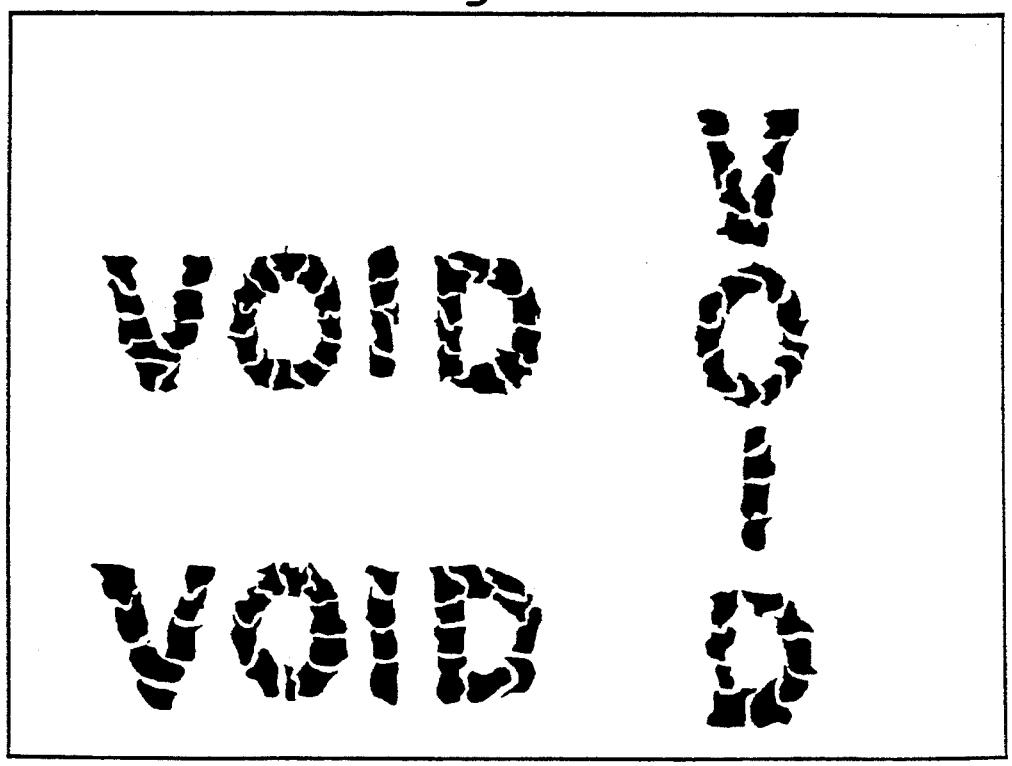
FIGS. 15 and 16 illustrate 7th and 8th examples of symbols making up security devices.
Figure 16:
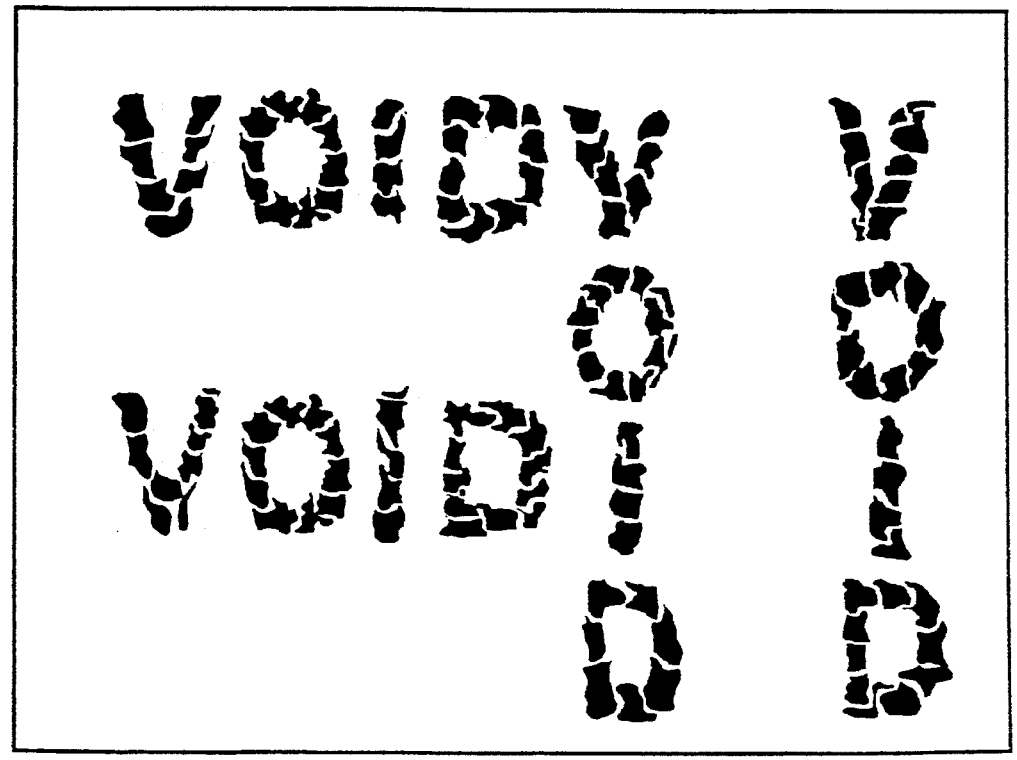
Figure 17:
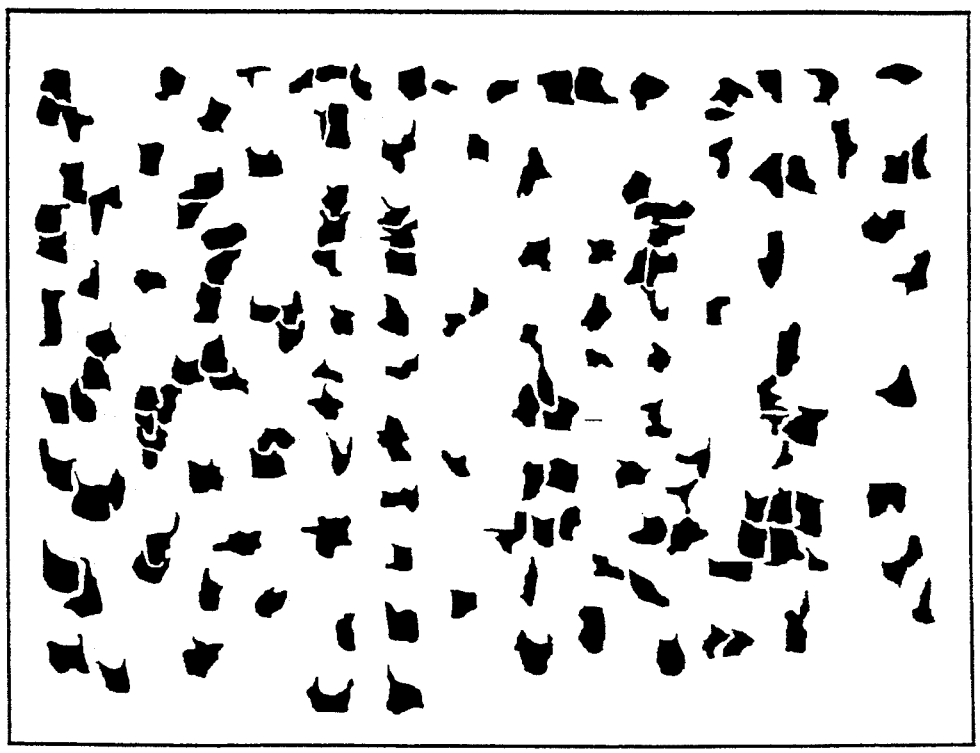
FIGS. 17 and 18 illustrate backgrounds for use with the examples shown in FIGS. 15 and 16.
Figure 18:
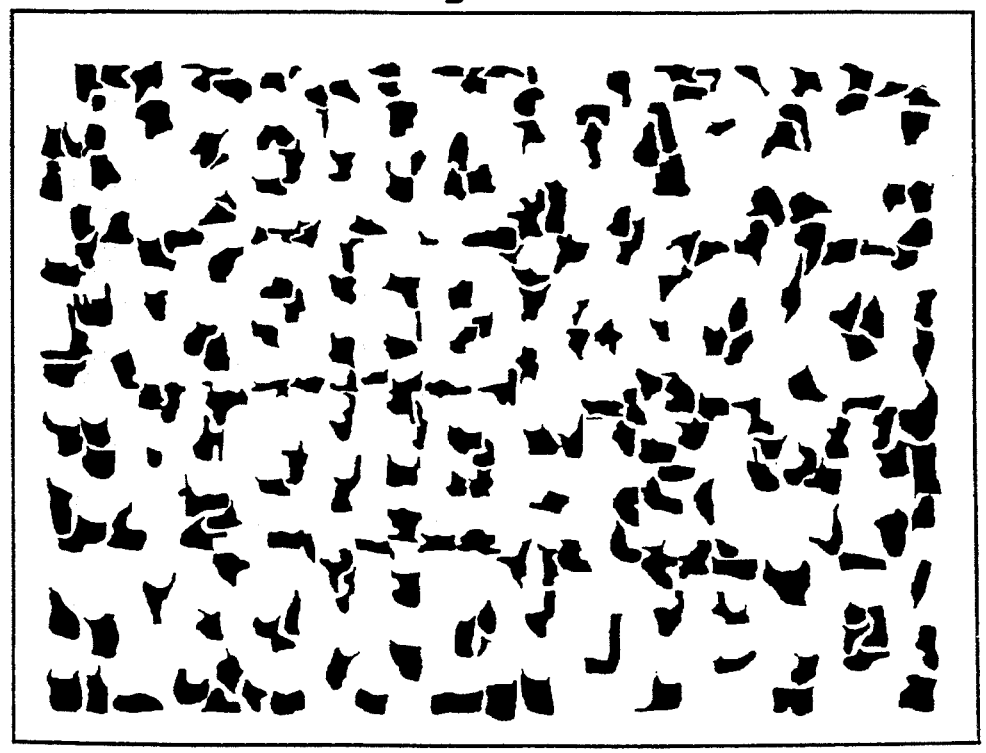

A further series of warning messages is shown in FIGS. 15, 16, and their backgrounds in 17 and 18. Here the irregularly shaped islands comprise rounded edges.

Figure 19:
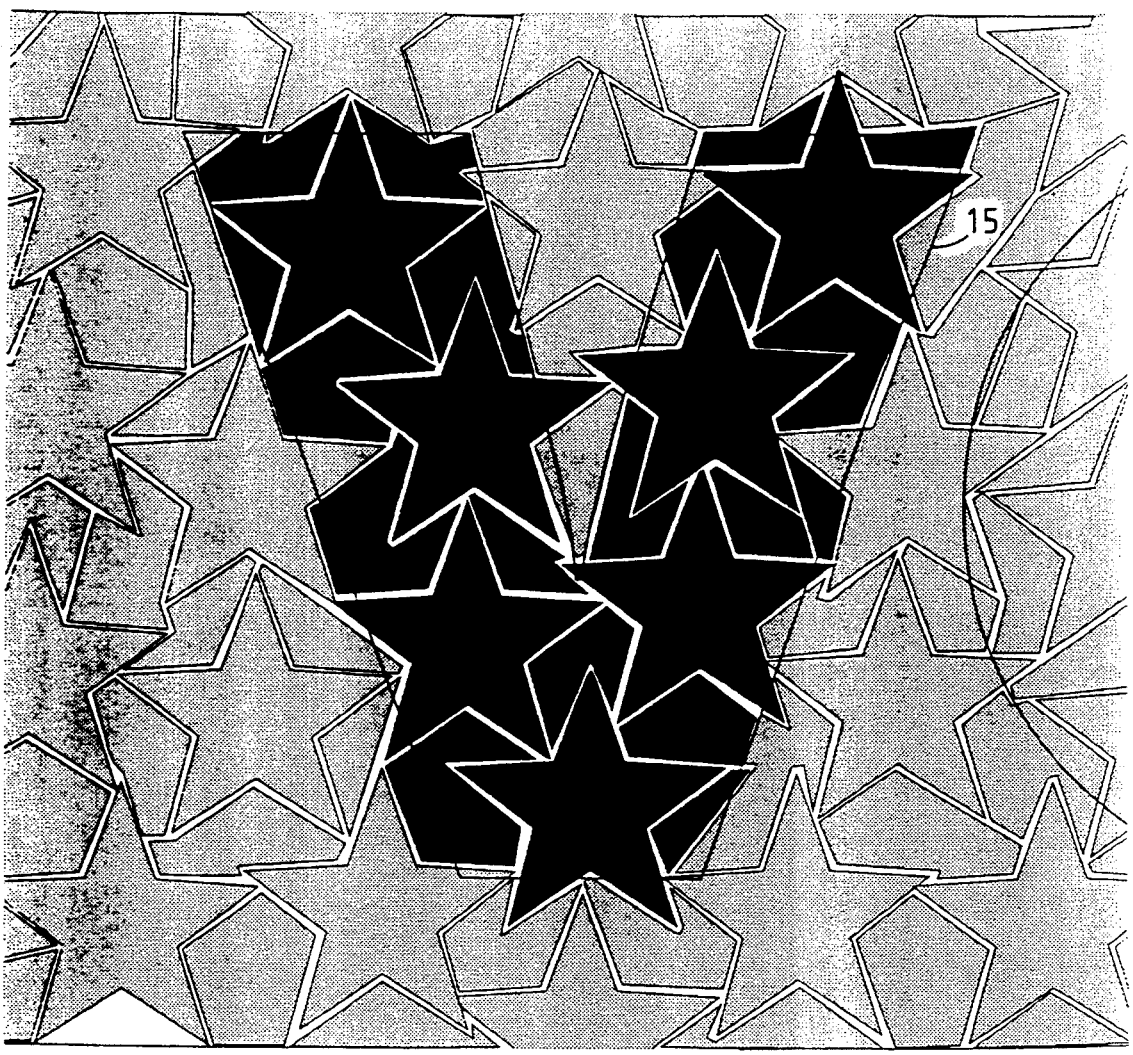
FIG. 19 illustrates an enlarged portion of a 9th example with the islands making up a symbol shown emboldened.

FIG. 19 shows an enlarged portion of a device area. The flat tint line structures within the polygonal array are not drawn for clarity. Polygons having the first flat tint structure and which combine to provide the visual appearance of a letter "V" are shown in dark. Background polygons are lightly shaded. Spaces between the polygons are unshaded.

The perimeter of the irregular outline can readily be determined by measurement. Shown in dotted line format 15 is the nominal letter "V" in the corresponding plain font. It can be seen that the background elements overlap this nominal perimeter 15. This would not be depicted in the device. Its perimeter can however be measured.

The areas of the warning message symbol and the notional plain font character can also be determined. The perimeter of the plain notional character is increased by over 14% and the area by approximately 12%. The irregular perimeter crosses the notional font perimeter in places without substantially reducing the readability of the character.

Figure 20:
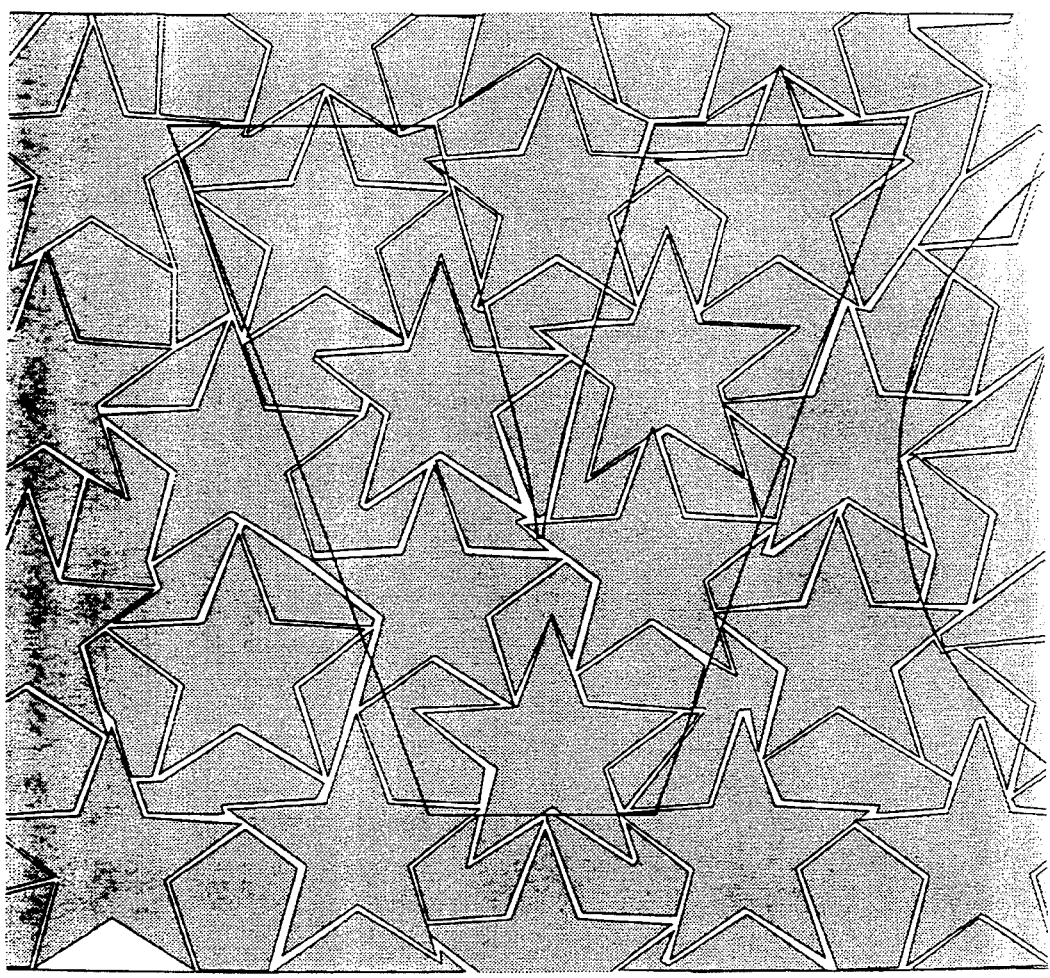
FIG. 20 is a view similar to FIG. 19 but without the islands emboldened.

In FIG. 20 the area of FIG. 19 is shown without the heavy shading but with the nominal font shape superimposed.

In determining the perimeter in structures which are composed of dot arrays it is intended that the notional edge line of the array should be taken as the perimeter.

Figure 21:
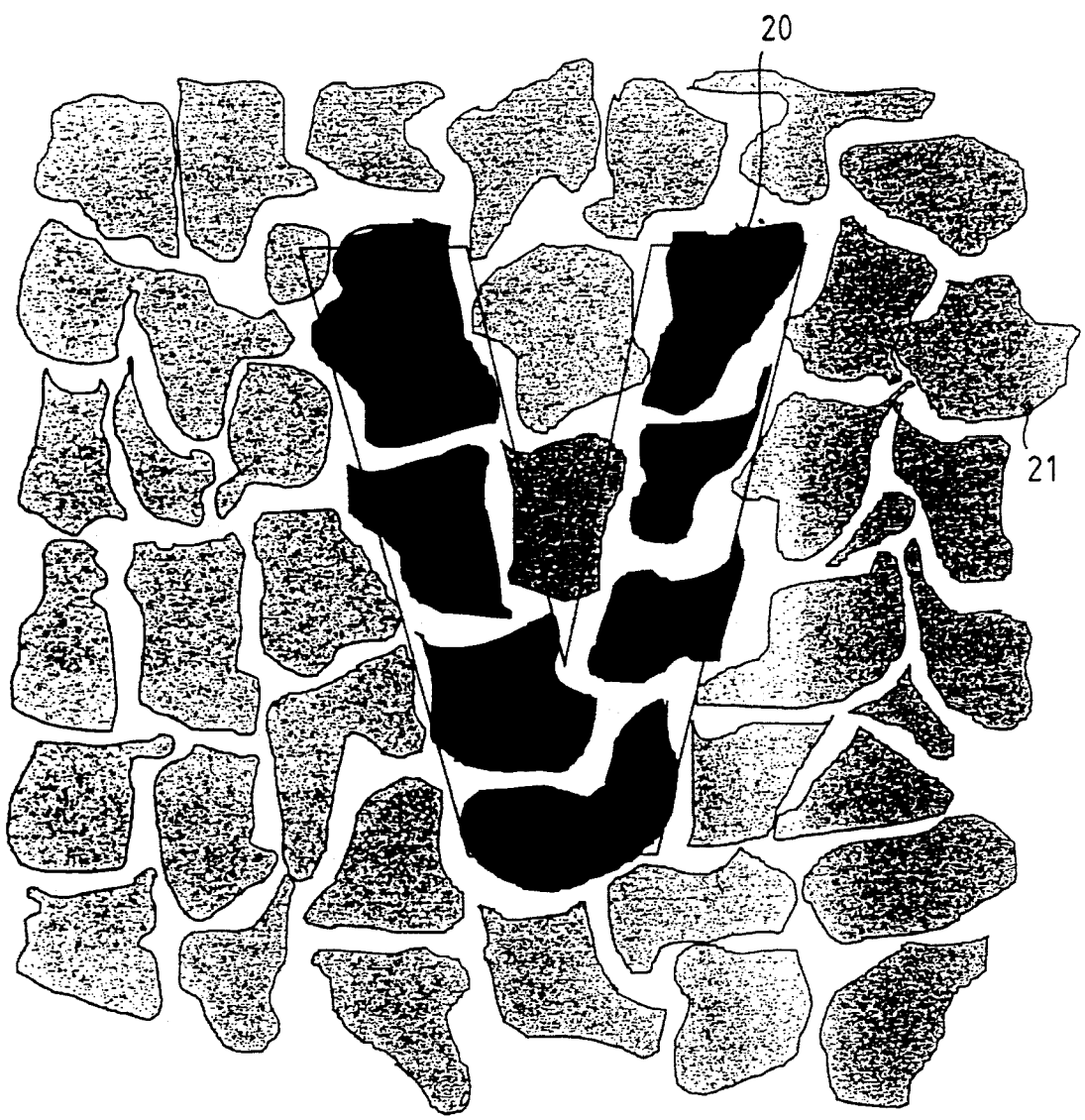
FIG. 21 illustrates in enlarged form a further example of a symbol and background of a security device.

FIG. 21 illustrates a further device having two sets of islands formed by respective printed line elements (not shown), the islands being defined by irregular parameters which are at least partly curved. Islands 20 define a symbol "V" while islands 21 define a background.

I claim:

1. A copy indicating security device including at least one symbol defined by a first arrangement of print elements, the or each symbol being provided in a background defined by a second arrangement of print elements, wherein under normal viewing conditions the security device presents a substantially flat tint to the eye and wherein the first and second arrangements of print elements differ from one another so that on copying the device at least one of the symbols is revealed and wherein the perimeter of the or each symbol is generally irregular.

2. A device according to claim 1, wherein said print elements comprise at least one of dots and lines.

3. A device according to claim 1, wherein at least one of said first and second arrangements of print elements comprises a tessellated arrangement of groups of print elements.

4. A device according to claim 3, wherein said groups are spaced from one another.

5. A device according to claim 3, wherein said groups of elements within an arrangement include at least one type of group in which all members of that type have a similar arrangement of print elements.

6. A device according to claim 3, wherein at least some of said groups of print elements within one of the arrangements have a similar shape.

7. A device according to claim 6, wherein said similar shape is a star.

8. A device according to claim 3, wherein at least some of said groups of print elements are irregularly shaped.

9. A device according to claim 3, wherein at least some of said groups are defined by substantially parallel lines.

10. A device according to claim 9, wherein said lines have a width in the range 50–150 microns.

11. A device according to claim 9, wherein said lines are spaced apart in the range 180–280 microns.

12. A device according to claim 9, wherein said lines of groups defining said first arrangement extend at an angle of at least 30 degrees relative to said lines of groups defining said second arrangement.

13. A device according to claim 9, wherein said lines of groups defining said first arrangement have a different width and spacing to said lines of groups defining said second arrangement.

14. A device according to claim 9, wherein at least some of the groups are defined by lines which diverge at less than 1°.

15. A device according to claim 14, wherein the lines diverge by less than 0.1°.

16. A device according to claim 1, having at least two symbols which are revealable when the device is copied at different orientations respectively.

17. A device according to claim 1, wherein the or each symbol is a recognisable character.

18. A device according to claim 17, wherein the or each symbol comprises one of a letter, number, geometrical symbol, or logo.

19. A device according to claim 18, wherein a number of symbols in the form of letters are provided which form a word.

20. A device according to claim 1, wherein the same symbol is repeated within the device.

21. A device according to claim 1, wherein said print elements are formed by printing ink.

22. A device according to claim 1, wherein said background print elements extend across a nominal perimeter line of the symbol defined by said first arrangement of print elements.

23. A security document provided with a copy indicating security device including at least one symbol defined by a first arrangement of print elements, the or each symbol being provided in a background defined by a second arrangement of print elements, wherein under normal viewing conditions the security device presents a substantially flat tint to the eye and wherein the first and second arrangements of print elements differ from one another so that on copying the device at least one of the symbols is revealed and wherein the perimeter of the or each symbol is generally irregular.

24. A security document according to claim 23, wherein said document is chosen from the group of security documents comprising bank notes, travellers cheques, bank cheques, tickets, passes, bonds, vouchers, certificates, fiscal documents, identity cards, passes, permits, licences, ballot forms, legal documents, vouchers, security labels, certificates of authenticity, brand protection labels, warranties, vehicle registration documents, passports, passbooks, credit or debit slips, credit cards, charge cards, financial transaction cards, bingo tickets, gaming tickets, lottery tickets and copy indicating paper suitable for electronically controlled printing.

25. A device according to claim 1, wherein said first arrangement of print elements is interleaved with said second arrangement of print elements.

26. A device according to claim 1, wherein the print elements of at least one of the first and second arrangements are configured to interlock with each other.

* * * * *